(12) United States Patent
Yang et al.

(10) Patent No.: US 11,970,154 B2
(45) Date of Patent: Apr. 30, 2024

(54) TRANSMISSION OUTPUT SPEED BASED WHEEL FLARE CONTROL SYSTEM FOR ELECTRIFIED VEHICLE APPLICATIONS

(71) Applicant: GM GLOBAL TECHNOLOGY OPERATIONS LLC, Detroit, MI (US)

(72) Inventors: Jie Yang, Okemos, MI (US); Robert L. Morris, Milford, MI (US); Shaochun Ye, Northville, MI (US); Vino Mathew, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 231 days.

(21) Appl. No.: 17/466,869

(22) Filed: Sep. 3, 2021

(65) Prior Publication Data

US 2023/0074458 A1    Mar. 9, 2023

(51) Int. Cl.
*B60W 30/02* (2012.01)
*B60W 30/18* (2012.01)
*B60W 40/10* (2012.01)
*B60W 40/101* (2012.01)
*B60W 50/02* (2012.01)
*B60L 15/10* (2006.01)
*B60W 40/103* (2012.01)

(52) U.S. Cl.
CPC ...... *B60W 30/02* (2013.01); *B60W 30/18172* (2013.01); *B60W 40/10* (2013.01); *B60W 40/101* (2013.01); *B60W 50/0205* (2013.01); *B60L 15/10* (2013.01); *B60W 40/103* (2013.01); *B60W 2520/28* (2013.01)

(58) Field of Classification Search
CPC .... B60L 15/10; B60L 15/20; B60L 2240/421; B60W 30/02; B60W 30/182; B60W 30/18172; B60W 40/10; B60W 50/0205; B60W 2520/26; B60W 2520/28
USPC .................. 701/36, 37, 70, 82, 91
See application file for complete search history.

(56) References Cited

U.S. PATENT DOCUMENTS

| 8,140,238 | B2* | 3/2012 | Luehrsen | B60T 8/175 |
| | | | | 180/197 |
| 2003/0200016 | A1* | 10/2003 | Spillane | B60W 30/182 |
| | | | | 701/36 |
| 2006/0265114 | A1* | 11/2006 | Thumrugoti | B60T 8/243 |
| | | | | 303/121 |
| 2007/0027605 | A1* | 2/2007 | Fodor | B60W 30/02 |
| | | | | 180/197 |
| 2008/0288146 | A1* | 11/2008 | Beechie | B60W 30/18027 |
| | | | | 701/58 |

(Continued)

OTHER PUBLICATIONS

U.S. Appl. No. 17/408,573, filed Aug. 23, 2021, Ye et al.

*Primary Examiner* — Adam D Tissot
*Assistant Examiner* — Aaron K McCullers

(57) ABSTRACT

A control system for a vehicle includes wheel slip control loop including a wheel slip controller configured to control wheel slip based on wheel speed measured at one or more wheels of the vehicle. A wheel flare control loop includes a wheel flare controller configured to control wheel flare based on transmission output speed at an output of a transmission of the vehicle. A controller is configured to select one of the wheel slip controller to control the wheel slip and the wheel flare controller to control the wheel flare during operation of the vehicle.

17 Claims, 6 Drawing Sheets

(56) References Cited

U.S. PATENT DOCUMENTS

| | | | |
|---|---|---|---|
| 2009/0228183 A1* | 9/2009 | Watabe | B60T 8/1706 |
| | | | 701/90 |
| 2013/0184918 A1* | 7/2013 | Motosugi | B60L 15/20 |
| | | | 701/22 |
| 2018/0237001 A1* | 8/2018 | Lian | B60L 7/10 |
| 2022/0212543 A1* | 7/2022 | Sullivan | B60L 15/20 |
| 2022/0266846 A1* | 8/2022 | Nose | B60W 50/12 |

* cited by examiner

TRANSMISSION OUTPUT SPEED BASED WHEEL FLARE CONTROL SYSTEM FOR ELECTRIFIED VEHICLE APPLICATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to control systems for controlling wheel slip and wheel flare in drivetrains of electrified vehicles.

Electrified vehicles include hybrid vehicles and battery electric vehicles (BEVs). Hybrid vehicles include a drivetrain including an internal combustion engine, one or more electric motors and a battery system including one or more battery packs. Battery electric vehicles (BEVs) include one or more electric motors and one or more battery packs.

Electrified vehicles typically include a brake controller that communicates with one or more wheel speed sensors in each wheel hub assembly. The wheel speed sensors measure wheel speed of the respective wheel. The brake controller uses the measured wheel speed as a feedback signal to control the wheel speed and wheel slip of the respective wheel by communicating torque commands to the powertrain controller.

Brake controllers typically communicate with the powertrain controller at a relatively slow rate over a CAN network and it takes time for the torque commands to work their way through the control system and driveline to affect the wheels, which are physically located at the far end of the drivetrain. Therefore, the initial reaction to wheel slip sensed by the brake controller is limited by system response time and communication delay. Due to the slow response time, components such as the axle and/or drive unit of the vehicle may be damaged. Rapid wheel speed changes during wheel flare events may cause driveline torque to exceed the torque limits, high axle stress and/or component breakage.

SUMMARY

A control system for controlling wheel slip of one or more wheels of a vehicle includes wheel slip control loop including a wheel slip controller configured to control wheel slip based on wheel speed measured at one or more wheels of the vehicle. A wheel flare control loop includes a wheel flare controller configured to control wheel flare based on transmission output speed at an output of a transmission of the vehicle. A controller is configured to select one of the wheel slip controller to control the wheel slip and the wheel flare controller to control the wheel flare during operation of the vehicle.

In other features, the controller selects the wheel flare controller to control the wheel flare when the measured wheel speed is greater than a predetermined wheel speed reference and transmission output acceleration is greater than a predetermined transmission output acceleration reference. The controller selects the wheel flare controller to control the wheel flare for a predetermined period after measured wheel speed exceeds a predetermined wheel speed reference and transmission output acceleration exceeds a predetermined transmission output acceleration reference. After the predetermined period, the controller selects the wheel slip controller to control the wheel slip.

In other features, prior to controlling the wheel flare using the wheel flare controller, the controller determines whether one or more disable closed loop conditions are present. The one or more disable closed loop conditions are selected from a group consisting of transmission output speed is disabled; a motor fault occurs; a higher priority function is controlling wheel slip; and a battery fault occurs.

The wheel flare control loop is configured to multiply a wheel speed reference by a drive ratio to generate an output speed reference; sample the output speed reference at a first sampling rate to generate a sampled output speed reference; and output the sampled output speed reference to a non-inverting input of a summer. An output of the summer is connected to the wheel flare controller. The wheel flare controller outputs a wheel flare torque command based on the output of the summer.

In other features the wheel flare control loop is configured to output the wheel flare torque command to a plant, wherein the plant determines a transmission output speed based in the wheel flare torque command; and sample the transmission output speed at a second sampling rate to generate a sampled output speed and output the sampled output speed to an inverting input of the summer.

In other features, the wheel flare control loop has a first loop delay. The wheel slip control loop has a second loop delay that is longer than the first loop delay.

In other features, the wheel slip control loop is configured to multiply the wheel speed reference by a drive ratio to generate an output speed reference; and sample the output speed reference at a third sampling rate to generate a sampled output speed reference, wherein the third sampling rate is greater than the first sampling rate.

A control system for controlling wheel slip of one or more wheels of a vehicle comprises a wheel slip control loop including a wheel slip controller configured to control wheel slip based on wheel speed measured at one or more wheels of the vehicle. A wheel flare control loop includes a wheel flare controller configured to control wheel flare based on transmission output speed at an output of a transmission of the vehicle. A controller is configured to select one of the wheel slip controller to control the wheel slip and the wheel flare controller to control the wheel flare during operation of the vehicle; select the wheel flare controller to control the wheel flare for a predetermined period after the measured wheel speed exceeds a predetermined wheel speed reference and transmission output acceleration exceeds a predetermined transmission output acceleration reference; and after the predetermined period, select the wheel slip controller to control the wheel slip.

In other features, prior to controlling the wheel flare using the wheel flare controller, the controller determines whether one or more disable closed loop conditions are present. The one or more disable closed loop conditions are selected from a group consisting of transmission output speed is disabled; a motor fault occurs; a higher priority function is controlling wheel slip; and a battery fault occurs.

In other features, the wheel flare control loop is configured to multiply a wheel speed reference by a drive ratio to generate an output speed reference; sample the output speed reference at a first sampling rate to generate a sampled output speed reference; and output the sampled output speed reference to a non-inverting input of a summer. An output of the summer is connected to the wheel flare controller. The wheel flare controller outputs a wheel flare torque command based on the output of the summer.

In other features, the wheel flare control loop is configured to output the wheel flare torque command to a plant, wherein the plant determines a transmission output speed based in the wheel flare torque command and sample the transmission output speed at a second sampling rate to generate a sampled output speed and output the sampled output speed to an inverting input of the summer.

In other features, the wheel flare control loop has a first loop delay, and wherein the wheel slip control loop has a second loop delay that is longer than the first loop delay. A wheel slip control loop is configured to multiply the output speed reference by a drive ratio to generate an output speed reference and sample the output speed reference at a third sampling rate to generate a sampled output speed reference, wherein the third sampling rate is greater than the first sampling rate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to a control system for controlling wheel slip and wheel flare in electrified vehicles such as hybrid and battery electric vehicles. A wheel flare controller (WFC) described herein detects wheel flare events based on measured wheel speed and transmission output acceleration at an early stage of wheel slip. The WFC has a faster response time and is able to control the wheel speed to prevent damage to drivetrain components such as the axle and/or the drive unit during wheel flare events. As a result, the total axle torque is controlled to a predetermined torque level. In some examples, the wheel speed is controlled during the wheel flare event and then control returns to a wheel slip controller (WSC). Using the transmission output speed as a feedback signal reduces the destabilizing effect of axle windup and avoids response issues that may be present when antilock braking system (ABS) feedback signals are used.

Wheel speed can increase very quickly in a very short time due to the small inertia of the wheels. Wheel flare events typically occur when there is an abrupt change in traction on a road surface. For example, wheel flare events may occur when a wheel of the vehicle spins faster than normal driving conditions relative to a surface the vehicle is traveling over, such as when the wheel loses traction with the ground or the wheel is lifted off the ground. The WSC has a slower response and does not have sufficient bandwidth to adequately control the wheel flare issue due to the short duration of wheel flare events. The control system including the WFC according to the present disclosure controls wheel flare events based on transmission output speed as will be described further below.

Figure 1A:
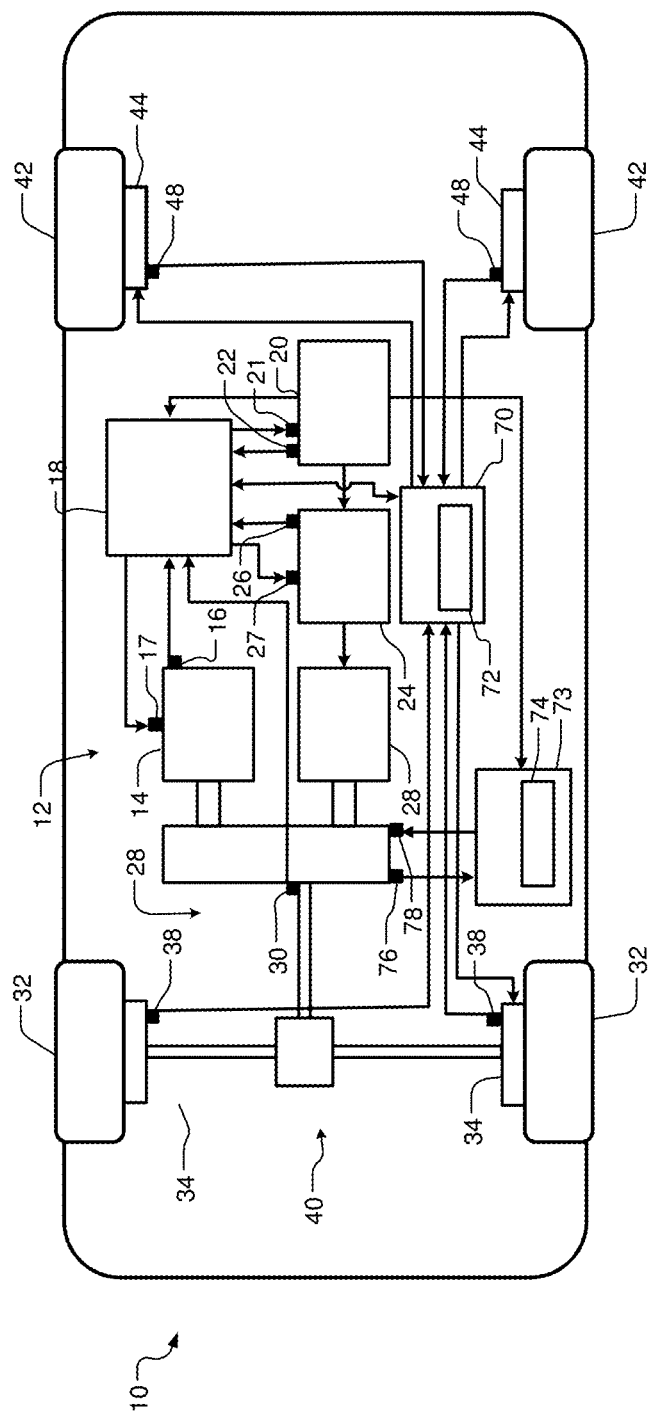
FIG. 1A is a simplified functional block diagram of an example of an hybrid vehicle including a wheel flare controller (WFC) for controlling wheel flare according to the present disclosure.
Figure 1B:
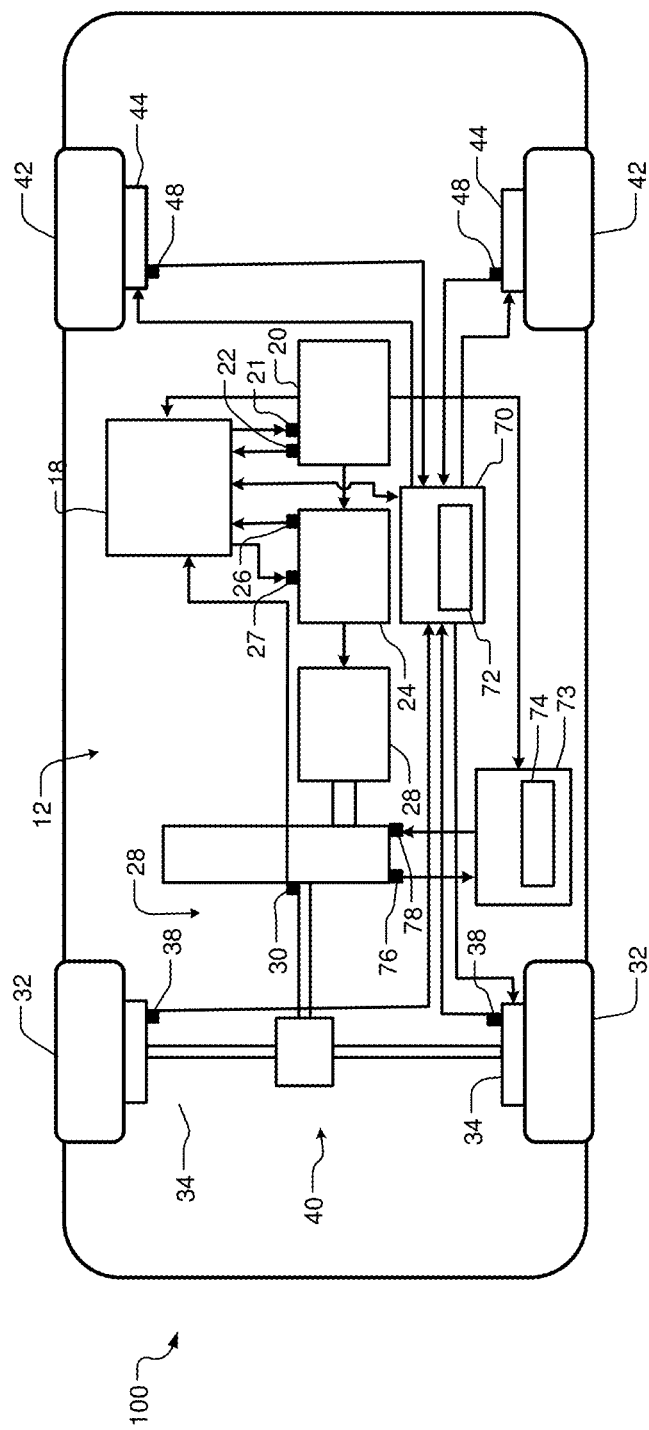
FIG. 1B is a simplified functional block diagram of an example of a battery electric vehicle (BEV) including a wheel flare controller (WFC) for controlling wheel flare according to the present disclosure.

Referring now to FIGS. 1A and 1B, hybrid and battery electric vehicles are shown. In FIG. 1A, a hybrid vehicle 10 includes a drivetrain 12 including an internal combustion engine (ICE) 14 and one or more electric motors 28. A controller 18 of the ICE 14 receives outputs from one or more sensors 16 such as pressure sensors, temperature sensors, speed sensors, etc. The controller 18 generates control signals for actuators 17 such as a throttle, fuel injectors, etc. to vary operation of the ICE 14.

One or more battery packs 20 supply DC power to a DC-AC inverter 24, which supplies three-phase AC power to the electric motor 28 as needed. The controller 18 receives output of one or more sensors 22 and 26 associated with the battery packs 20 and the DC-AC inverter 24, respectively. Examples of the sensors 22 and 26 include voltage sensors, current sensors, temperature sensors, etc. In some examples, the controller 18 alters operation of the battery packs 20 and/or the DC-AC inverter 24 using actuators 21 and 27 based on the feedback from the sensors 22 and 26, respectively.

The hybrid vehicle 10 further includes front wheels 32 and wheel hub assemblies 34 including wheel speed sensors 38. In some examples, the ICE 14 and the electric motor 28 drive the front wheels through a mechanical coupling 40 that may include one or more of a transmission, axle, drive shafts, differential and/or other type of drive unit.

The vehicle 10 includes rear wheels 42 and wheel assemblies 44 including wheel speed sensors 48. In this example, the front wheels 32 are driven by the ICE 14 or the one or more electric motors 28 or a combination thereof. In other examples, all of the wheels are driven by the ICE or the electric motor or both, one or more additional electric motors are provided to drive the rear wheels, the front wheels or all of the wheels, etc.

The controller 18 controls operation of the ICE 14 and the electric motor 28. A controller 70 includes a wheel slip controller (WSC) 72 that communicates with the wheel speed sensors 38 and 48 and performs wheel slip control based on the measured wheel speed. In some examples, the controller 70 corresponds to an antilock braking system (ABS) controller, although another controller can be used.

A controller 73 communicates with the controller 18, sensors 76 and actuators 78 to control the transmission. In some examples, the controller 73 corresponds to a transmisson controller, although another controller can be used. The controller 73 includes a wheel flare controller (WFC) 74. Under certain conditions, the WFC 74 performs wheel flare control based on the transmission output speed to detect wheel flare events and limits wheel speed as will be described further below. While two controllers 70 and 73 are shown, a single controller can be used and/or additional controllers can be used. Alternately, the WFC 74 can be part of the controller 18 or another controller and/or the WSC 72 can be part of the controller 18 or another controller such as a brake controller.

In FIG. 1B, a battery electric vehicle 100 is shown. The battery electric vehicle 100 does not include the ICE and other related components as shown in FIG. 1A.

Figure 2:
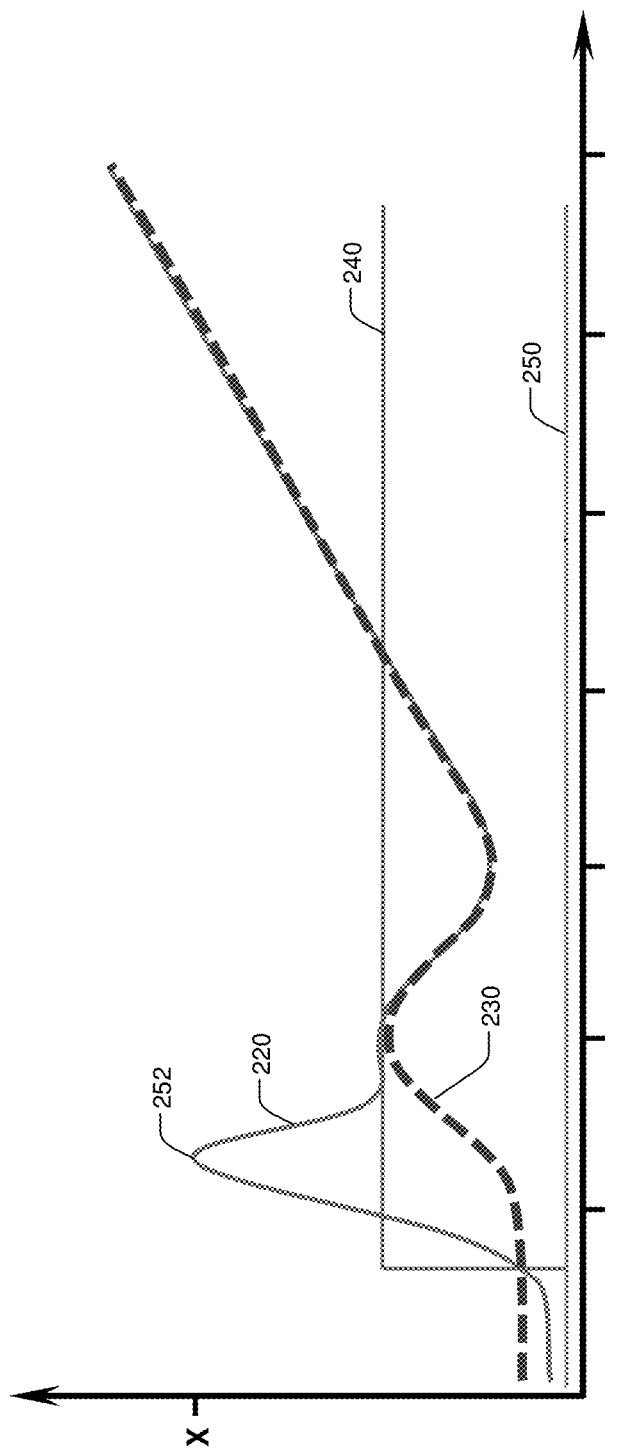
FIG. 2 is a graph illustrating simulated wheel speed as a function of time during a wheel flare event without using the WFC of FIG. 1.

Referring now to FIG. 2, wheel speed is shown as a function of time during simulation of a wheel flare event when the WSC 72 is enabled and the WFC 74 is disabled. In FIG. 2, wheel speed is identified at 220, a wheel speed target is identified at 230, traction control on/off is identified at 240 and wheel flare control of the WFC 74 is off as shown at 250. As can be seen, the wheel speed 220 increases quickly to a maximum wheel speed 252 during a wheel flare event before the traction control system can control the wheel flare event. The WFC 74 according to the present disclosure limits wheel speed more quickly during the wheel flare event as will be described further below in FIGS. 3, 5 and 6.

Figure 3:
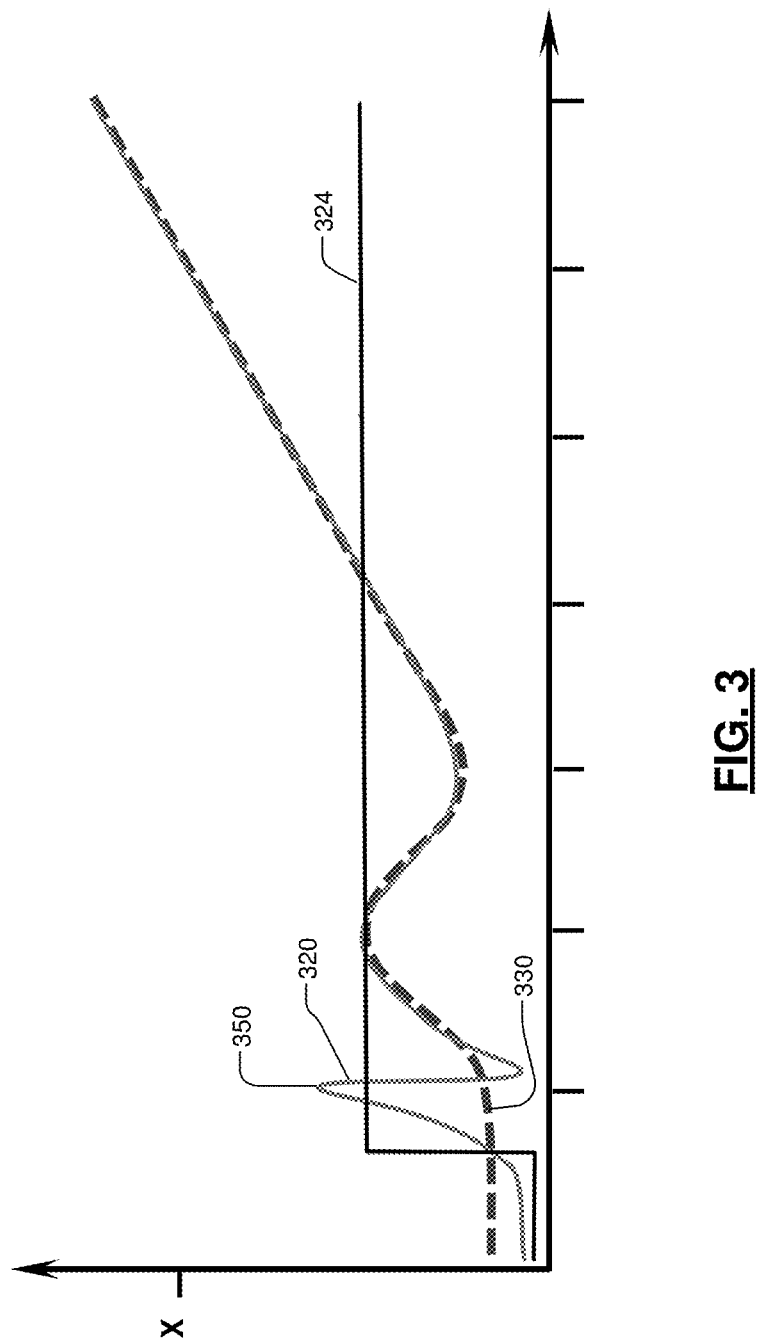
FIG. 3 is a graph illustrating simulated wheel speed as a function of time for a wheel flare event when using the WFC of FIG. 1.

Referring now to FIG. 3, the wheel flare event is shown during simulation while the WFC 74 is enabled. During the same simulated conditions as FIG. 2, wheel speed 320 increases relative to a speed target 330 for a maximum wheel speed 350 that is lower than the maximum wheel speed 252 in FIG. 2. Traction control on/off is shown at 324.

Figure 4:
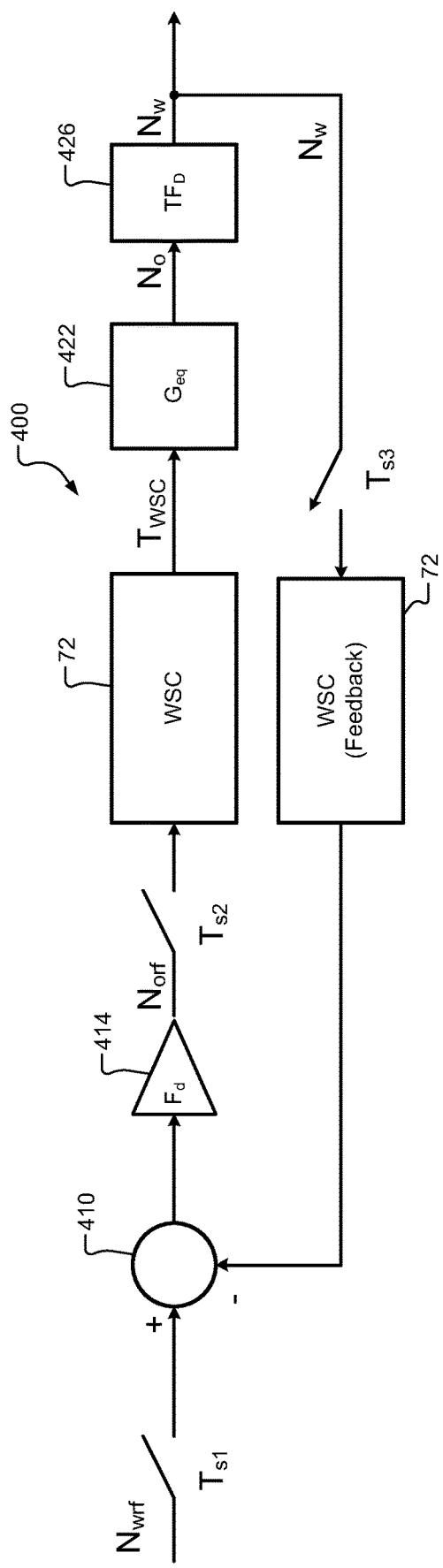
FIG. 4 illustrates of an example a WSC control loop including the WSC for controlling wheel slip based on measured wheel speed.

Referring now to FIG. 4, a WSC control loop 400 controls wheel slip based on wheel speed. $N_{wrf}$ corresponds to a wheel speed reference, $N_{orf}$ corresponds to an output speed reference, $N_o$ corresponds to transmission output speed, $N_w$ corresponds to wheel speed and $TF_d$ corresponds to a driveline dynamics plant or transfer function that determines wheel speed $N_w$ based on transmission output speed $N_o$. The wheel speed reference $N_{wrf}$ is sampled at a rate $T_{s1}$ and input to a non-inverting input of a summer 410.

An output of the summer 410 is input to an amplifier 414. The amplifier 414 multiples the output of the summer by the drive ratio $F_d$ and outputs an output speed reference $N_{orf}$ (sampled at a second rate $T_{s2}$) to a feedforward wheel slip controller 72, which determines a wheel slip control torque command $T_{WSC}$. $T_{WSC}$ is output to a plant $G_{eq}$ 422, which outputs the transmission output speed $N_o$ based on the WSC torque $T_{WSC}$. The transmission output speed $N_o$ is output to a driveline dynamics plant or function 426 that outputs the wheel speed $N_w$ as a function of transmission output speed $N_o$. The wheel speed $N_w$ is sampled at a third rate $T_{s3}$ and output to the WSC 72, which provides feedback to the summer 410. As can be appreciated, the sampling periods $T_{s1}$, $T_{s2}$ and $T_{s3}$ can be set to any suitable values. In some examples, $T_{s1}<T_{s2}$, $T_{s3}<T_{s1}$, and $T_{s3}<T_{s2}$. In some examples, $T_{s1}=10$ ms, $T_{s2}=12.5$ ms and $T_{s3}=5$ ms.

Figure 5:
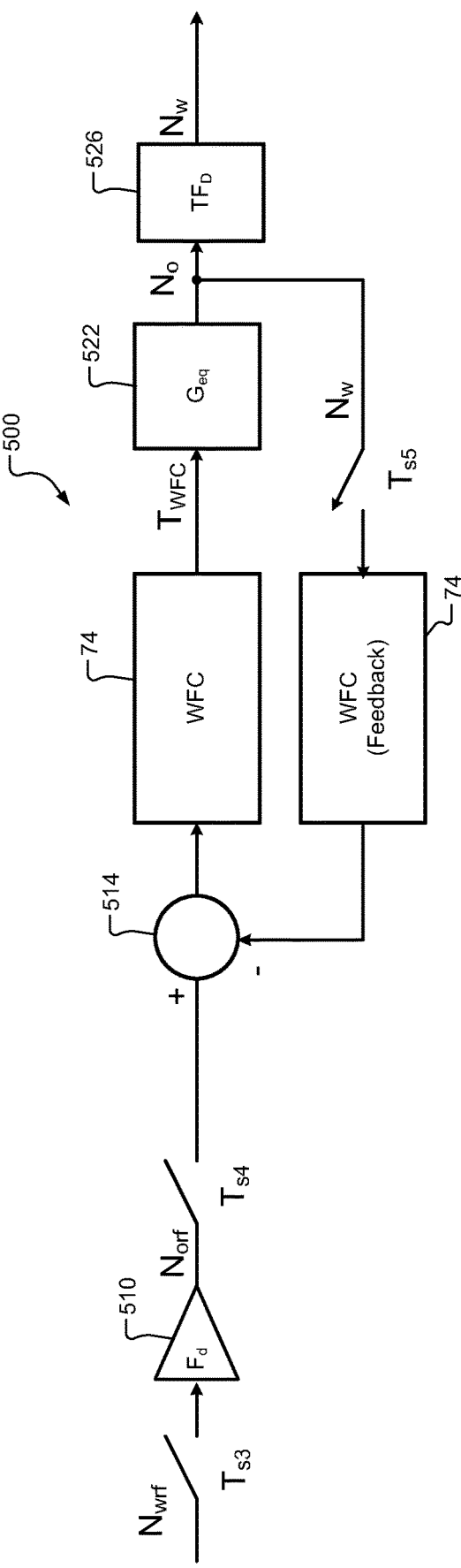
FIG. 5 illustrates of an example a WFC control loop including the WFC for controlling wheel flare based on transmission output speed according to the present disclosure.

Referring now to FIG. 5, a WFC control loop 500 uses transmission output speed as feedback to the WFC 74. In FIG. 5, $N_{wrf}$ corresponds to a wheel speed reference, $N_{orf}$ corresponds to an output speed reference, $N_o$ corresponds to transmission output speed, $N_w$ corresponds to wheel speed and $TF_d$ corresponds driveline dynamics. The wheel speed reference $N_{wrf}$ is sampled at a rate $T_{s4}$ and input to an amplifier 510.

The amplifier 510 multiples the wheel speed reference $N_{wrf}$ by the drive ratio Fa and outputs an output speed reference $N_{orf}$ (sampled at a second rate $T_{s5}$) to a non-inverting input of the summer 514. An output of the summer is input to the WFC 74, which determines a wheel flare control torque command $T_{WFC}$. $T_{WFC}$ is output to a plant $G_{eq}$ 522, which outputs the output speed $N_o$. The output speed $N_o$ is output to an driveline dynamics plant or transfer function 526 that outputs the wheel speed $N_w$ as a function of output speed $N_o$. The output speed $N_o$ is sampled at a third rate $T_{s6}$ and output as feedback to an inverting input of the summer 514 (having an output connected to the WFC 74). As can be appreciated, the sampling periods $T_{s4}$, $T_{s5}$ and $T_{s6}$ can be set to any suitable values. In some examples, $T_{s5}<T_{s4}$, $T_{s6}<T_{s4}$, and/or $T_{s6}=T_{s5}$, although other relationships can be used. In some examples, $T_{s4}=10$ ms, $T_{s5}=6.25$ ms and $T_{s6}=6.25$ ms, although other values can be used.

Figure 6:
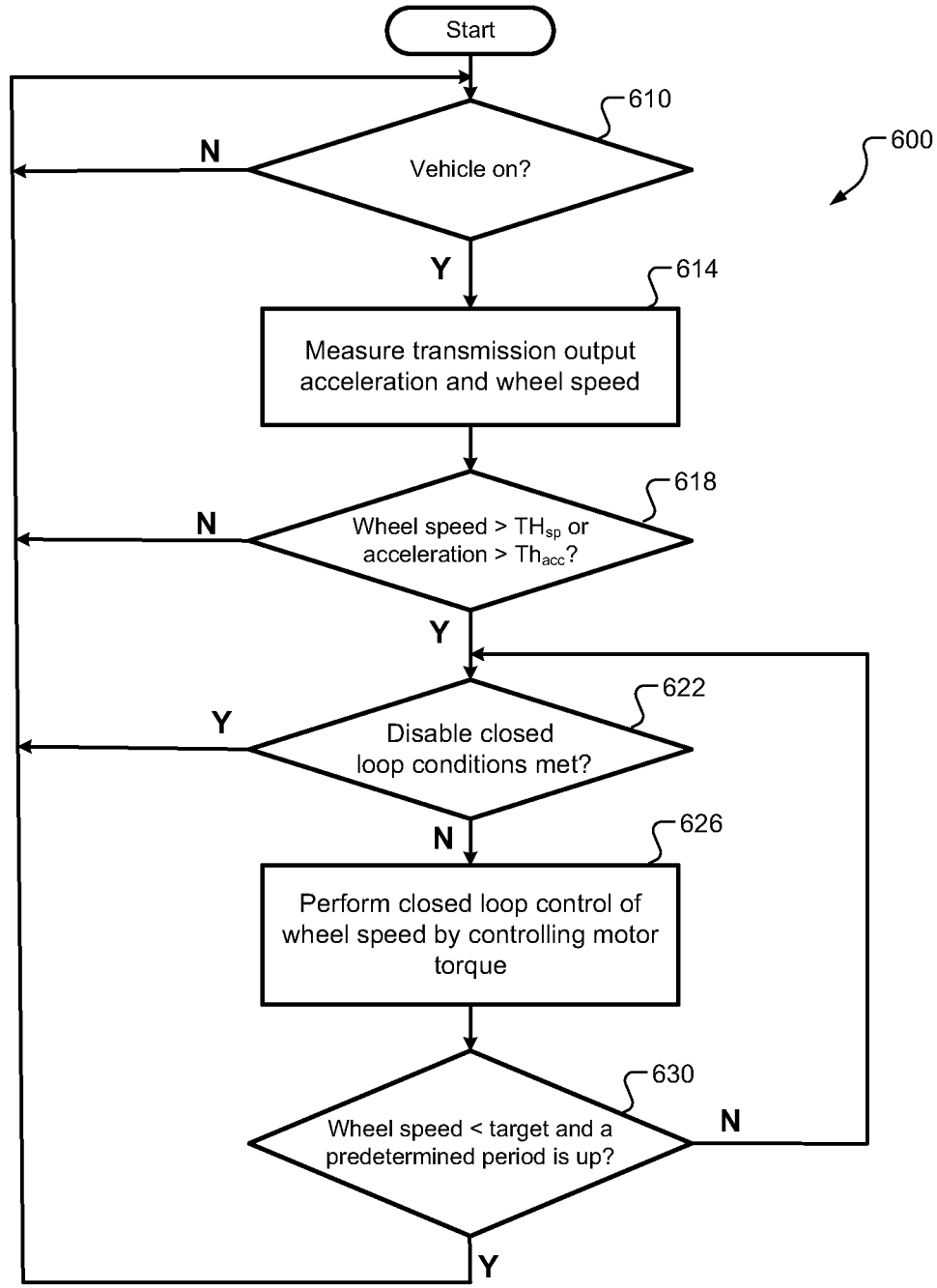
FIG. 6 is a flowchart of an example of a method for operating the WFC and the WSC according to the present disclosure.

Referring now to FIG. 6, a method 600 for controlling wheel slip and wheel flare according to the present disclosure is shown. At 610, the method determines whether the vehicle is on. If 610 is true, the method determines wheel speed and transmission output acceleration at 614. At 618, the method determines whether the wheel speed and transmission output acceleration are less than a wheel speed threshold $TH_{sp}$ and a transmission output acceleration threshold $TH_{acc}$, respectively. If either condition is not true, the method returns to 610. If both conditions are true, the method continues at 622 and determines whether disable closed loop conditions are met.

The disable control loop conditions may include various conditions that require the wheel flare control to be disabled. In some examples, the disable control loop conditions may include one or more of the following conditions: transmission output speed is not available, a motor fault occurs, a higher priority function is controlling wheel slip (e.g. an electronic differential locker (e-locker) is active), a battery fault occurs, and/or the brake controller asserts a wheel slip or flare override condition.

If one or more of the disable control loop conditions in 622 are true, the method returns to 610. If the disable control loop conditions are not met in 622, the method continues at 626 and performs closed loop control of wheel flare by controlling motor torque. At 630, the method determines whether the wheel speed is less than a target wheel speed and a predetermined period is up. In some examples, the predetermined period is reset after step 618 transitions to true. If 630 is false, then the method returns to 622. If 630 is true, then the method returns to 610.

In some examples, the transmission output speed is sampled by the WFC at a high rate such as 6.25 ms rate and has sufficient bandwidth to allow the wheel flare event to be controlled. The WFC uses transmission output speed as feedback signal and has shorter loop delays as compared to the WSC using wheel speed as feedback.

The WFC control loop 500 reduces the wheel speed (in response to the wheel flare events) to the target speed more quickly than the WSC control loop 400. The WFC control loop 500 maintains the wheel speed to the target speed level during the predetermined period until the WSC takes over. In some examples, the predetermined period is less than 1 second (e.g. 25 ms to 250 ms), although longer or shorter periods can be used. The total axle torque can be reduced to the desired level to effectively protect the drivetrain components.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for controlling wheel flare of one or more wheel in a vehicle, comprising:
   a wheel slip control loop including a wheel slip controller configured to control wheel slip based on wheel speed measured at one or more wheels of the vehicle;
   a wheel flare control loop including a wheel flare controller configured to control wheel flare based on transmission output speed at an output of a transmission of the vehicle, the wheel flare controller configured to sample the transmission output speed of the transmission of the vehicle at a sampling rate of 6.25 ms or less; and
   a controller configured to select one of the wheel slip controller to control the wheel slip and the wheel flare controller to control the wheel flare during operation of the vehicle, the controller configured to select the wheel flare controller to control the wheel flare for a predetermined period in a range between 25 ms and 250 ms, and to select the wheel slip controller after the predetermined period, wherein,
   the wheel slip control loop includes a first amplifier, a first summer, and a first plant, the first amplifier is configured to multiply an output of the first summer by a drive ratio and output an output speed reference to the wheel slip controller, and the wheel slip controller is configured to output a wheel slip control torque command to the first plant, and
   the wheel flare control loop includes a second amplifier, a second summer, and a second plant, the second amplifier is configured to multiply a wheel speed reference by the drive ratio and output the output speed reference to a non-inverting input of the second summer, the second summer is configured to supply an output to the wheel flare controller, and the wheel flare controller is configured to output a wheel flare control torque command to the second plant.

2. The control system of claim 1, wherein the controller selects the wheel flare controller to control the wheel flare when the measured wheel speed is greater than a predetermined wheel speed reference or transmission output acceleration is greater than a predetermined transmission output acceleration reference.

3. The control system of claim 1, wherein the controller selects the wheel flare controller to control the wheel flare for the predetermined period after measured wheel speed exceeds a predetermined wheel speed reference or transmission output acceleration exceeds a predetermined transmission output acceleration reference.

4. The control system of claim 3, wherein after the predetermined period, the controller selects the wheel slip controller to control the wheel slip.

5. The control system of claim 1, wherein prior to controlling the wheel flare using the wheel flare controller, the controller determines whether one or more disable closed loop conditions are present.

6. The control system of claim 5, wherein the one or more disable closed loop conditions are selected from a group consisting of:
   transmission output speed is not available;
   a motor fault occurs;
   a higher priority function is controlling wheel slip; and
   a battery fault occurs.

7. The control system of claim 1, wherein the wheel flare control loop is configured to:
   multiply the wheel speed reference by the drive ratio to generate the output speed reference;
   sample the output speed reference at a first sampling rate to generate a sampled output speed reference; and
   output the sampled output speed reference to the non-inverting input of the second summer,
   wherein an output of the second summer is connected to the wheel flare controller, and
   wherein the wheel flare controller outputs the wheel flare control torque command based on the output of the second summer.

8. The control system of claim 7, wherein:
   the second plant determines a transmission output speed based on the wheel flare control torque command; and
   the wheel flare control loop is configured to sample the transmission output speed at a second sampling rate to generate a sampled output speed and output the sampled output speed to an inverting input of the second summer.

9. The control system of claim 8, wherein the wheel flare control loop has a first loop delay, and wherein the wheel slip control loop has a second loop delay that is longer than the first loop delay.

10. The control system of claim 7, wherein the wheel slip control loop is configured to:
    multiply the wheel speed reference by the drive ratio to generate the output speed reference; and
    sample the output speed reference at a third sampling rate to generate a sampled output speed reference, wherein the third sampling rate is greater than the first sampling rate.

11. A control system for controlling wheel flare of one or more wheels of a vehicle, comprising:
    a wheel slip control loop including a wheel slip controller configured to control wheel slip based on wheel speed measured at one or more wheels of the vehicle;
    a wheel flare control loop including a wheel flare controller configured to control wheel flare based on transmission output speed at an output of a transmission of the vehicle, the wheel flare controller configured to sample the transmission output speed of the transmission of the vehicle at a sampling rate of 6.25 ms or less; and
    a controller configured to:
       select one of the wheel slip controller to control the wheel slip and the wheel flare controller to control the wheel flare during operation of the vehicle;
       select the wheel flare controller to control the wheel flare for a predetermined period in a range between 25 ms and 250 ms, after the measured wheel speed exceeds a predetermined wheel speed reference or transmission output acceleration exceeds a predetermined transmission output acceleration reference; and
       after the predetermined period, select the wheel slip controller to control the wheel slip, wherein,
    the wheel slip control loop includes a first amplifier, a first summer, and a first plant, the first amplifier is configured to multiply an output of the first summer by a drive ratio and output an output speed reference to the wheel slip controller, and the wheel slip controller is configured to output a wheel slip control torque command to the first plant, and
    the wheel flare control loop includes a second amplifier, a second summer, and a second plant, the second amplifier is configured to multiple a wheel speed reference by the drive ratio and output an output speed reference to a non-inverting input of the second summer, the second summer is configured to supply an output to the wheel flare controller, and the wheel flare controller is configured to output a wheel flare control torque command to the second plant.

12. The control system of claim 11, wherein prior to controlling the wheel flare using the wheel flare controller, the controller determines whether one or more disable closed loop conditions are present.

13. The control system of claim 12, wherein the one or more disable closed loop conditions are selected from a group consisting of:
transmission output speed is not available;
a motor fault occurs;
a higher priority function is controlling wheel slip; and
a battery fault occurs.

14. The control system of claim 11, wherein the wheel flare control loop is configured to:
multiply the wheel speed reference by the drive ratio to generate the output speed reference;
sample the output speed reference at a first sampling rate to generate a sampled output speed reference; and
output the sampled output speed reference to the non-inverting input of the second summer,
wherein an output of the second summer is connected to the wheel flare controller, and
wherein the wheel flare controller outputs a wheel flare torque command based on the output of the second summer.

15. The control system of claim 14, wherein
the second plant determines a transmission output speed based on the wheel flare torque command; and
sample the transmission output speed at a second sampling rate to generate a sampled output speed and output the sampled output speed to an inverting input of the second summer.

16. The control system of claim 15, wherein the wheel flare control loop has a first loop delay, and wherein the wheel slip control loop has a second loop delay that is longer than the first loop delay.

17. The control system of claim 15, wherein the wheel slip control loop is configured to:
multiply the output speed reference by the drive ratio to generate the output speed reference; and
sample the output speed reference at a third sampling rate to generate a sampled output speed reference, wherein the third sampling rate is greater than the first sampling rate.

* * * * *